(12) United States Patent
Zhao et al.

(10) Patent No.: US 10,769,812 B2
(45) Date of Patent: Sep. 8, 2020

(54) LOCATION TRACKING

(71) Applicant: Microsoft Technology Licensing, LLC, Redmond, WA (US)

(72) Inventors: Chunshui Zhao, Redmond, WA (US); Khawar Zuberi, Bellevue, WA (US); Jie Liu, Medina, WA (US); Di Wang, Sammamish, WA (US); William Thomas, Redmond, WA (US); Yasser B. Asmi, Redmond, WA (US); Zhengyou Zhang, Mercer Island, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 195 days.

(21) Appl. No.: 15/965,710

(22) Filed: Apr. 27, 2018

(65) Prior Publication Data

US 2019/0333245 A1 Oct. 31, 2019

(51) Int. Cl.
G06K 9/00 (2006.01)
G06K 9/62 (2006.01)
G06T 7/73 (2017.01)

(52) U.S. Cl.
CPC .............. *G06T 7/75* (2017.01); *G06K 9/6256* (2013.01); *G06K 9/6262* (2013.01)

(58) Field of Classification Search
None
See application file for complete search history.

(56) References Cited

U.S. PATENT DOCUMENTS

| | | | | |
|---|---|---|---|---|
| 9,344,907 | B1 * | 5/2016 | Kravets | H04W 24/06 |
| 10,127,412 | B2 * | 11/2018 | Sadr | G01S 5/145 |
| 2009/0265105 | A1 * | 10/2009 | Davis | G01C 21/20 701/300 |
| 2016/0033635 | A1 * | 2/2016 | Hansen | G01S 13/75 342/451 |
| 2016/0381306 | A1 * | 12/2016 | Yang | G06T 3/40 386/280 |
| 2017/0322049 | A1 * | 11/2017 | Wootton | G01D 4/006 |
| 2019/0108396 | A1 * | 4/2019 | Dal Mutto | G06K 9/00771 |

* cited by examiner

*Primary Examiner* — Soo Shin
(74) *Attorney, Agent, or Firm* — Ranier Patents, P.S.

(57) ABSTRACT

The disclosure relates to tracking the location of a target object. In one example, a computer vision system detects a configuration of environment objects. A location model that has been trained for the environment configuration is selected. A signal associated with the target object is received and interpreted using the selected location model to determine the location of the target object.

20 Claims, 8 Drawing Sheets

LOCATION TRACKING

BRIEF DESCRIPTION OF THE DRAWINGS

The accompanying drawings illustrate implementations of the concepts conveyed in this disclosure. Features of the illustrated implementations can be more readily understood by reference to the following description in conjunction with the accompanying drawings. Like reference numbers in the various drawings are used where feasible to indicate like elements. In some cases, alphabet letters or parentheticals are utilized after a reference number to distinguish like elements. Use of the reference number without the associated alphabet letter or parenthetical is generic to the element.

DETAILED DESCRIPTION

Figure 1:
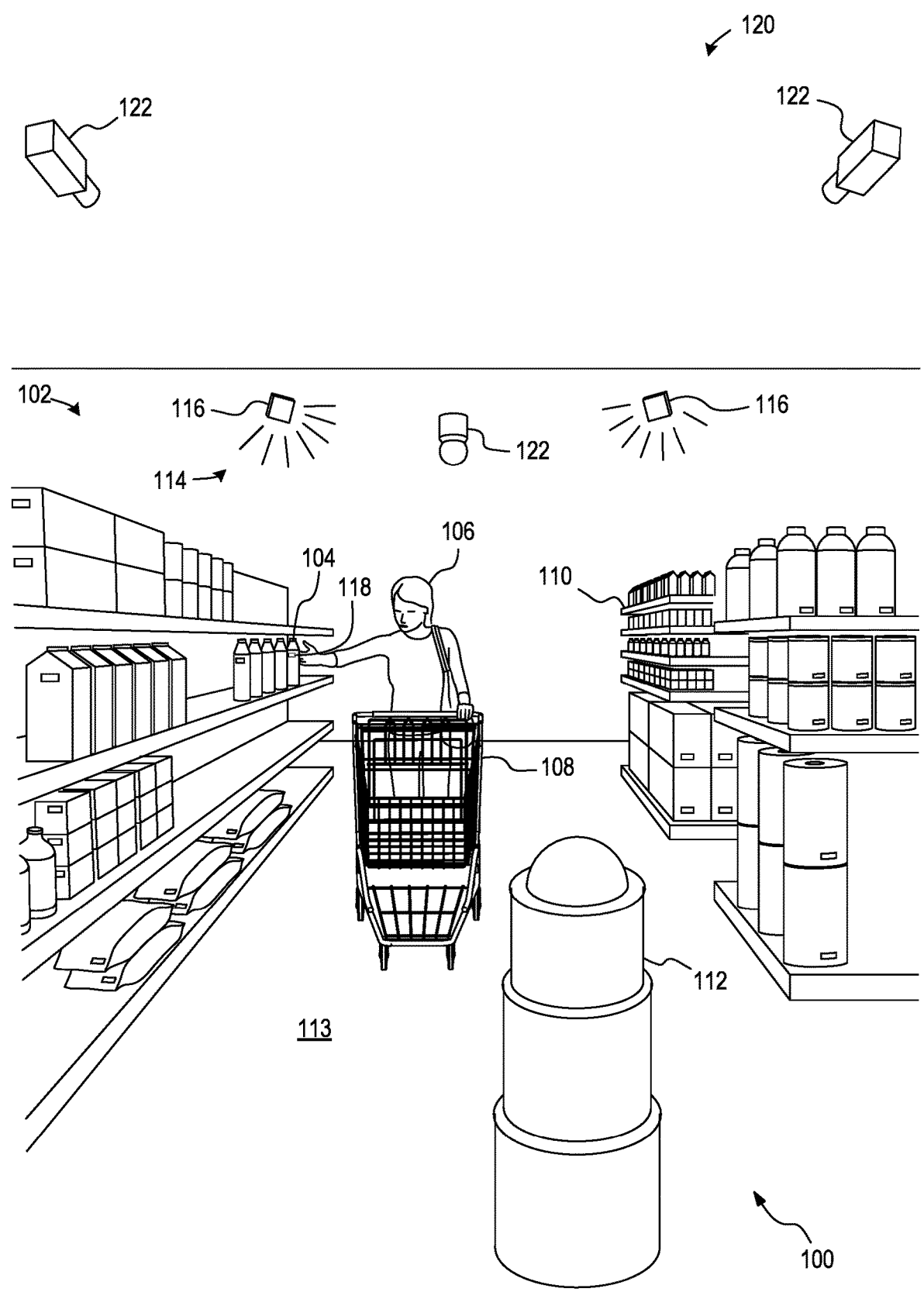
FIG. 1 shows a perspective view of an example location tracking environment where some implementations of the present concepts can be applied.

This patent relates to using radio-frequency (RF) sensors and computer vision to track the locations of objects and associate them among one another. The ability to accurately track the locations of objects, as well as to associate objects with one another based on their proximity, can have wide-ranging applications in a variety of scenarios, such as tracking inventory in warehouses, tracking parts in factories, tracking animals in agriculture, associating merchandise items with correct shoppers at checkout, and/or associating medications with correct patients at hospitals.

Radio frequency identification (RFID) sensors can use electromagnetic fields to detect and identify RFID tags attached to objects. Furthermore, RFID sensors can approximate the location of the RFID tags, particularly where multiple RFID sensors are arranged throughout an environment.

However, RFID signals propagating from RFID tags to RFID sensors are highly sensitive and prone to environmental interferences. Any object, such as a person, furniture, and/or a door, in the environment situated between an RFID sensor and an RFID tag may affect the signal received by the RFID sensor, resulting in sensor errors. For example, if a person stands between an RFID sensor and an RFID tag, then the received signal may be weaker than if the person were not standing in the way. Therefore, the RFID sensor may determine an incorrect location of the RFID tag by calculating that the RFID tag is farther away than it actually is based on the weakened signal.

Conventional techniques have attempted to address such environmental interferences by developing an RFID signal propagation model for calculating the location of the RFID tag based on the received RFID signals. For example, a location model developed specifically for a particular warehouse containing a system of RFID sensors may include formulas that compensate for known interferences (e.g., shelves, storage bins, crates, walls, doors, etc.) when calculating the location of an object. An RFID sensor system can interpret the received RFID signals by adjusting for how these interferences affect RFID signal propagation in the environment. Unfortunately, such a pre-defined model may still be inaccurate at runtime because the environment is usually dynamic: shelves are emptied and filled, storage bins are moved, people walk about, forklifts move around and are parked at various locations, doors open and close, etc. Accordingly, a pre-defined signal propagation model may be useless at runtime. One conventional technique involves developing a model that tries to average out the potential interferences. But again, such a model is not flexible enough to provide accurate location information in a dynamic environment, especially given that RFID signal propagation is highly dependent on the environment.

Accordingly, some of the present implementations relate to using a computer vision system in conjunction with a radio frequency sensor system, such as an RFID system, to develop multiple models that are tailored for various environment configurations. At an offline training stage, the computer vision system, including a set of cameras, can provide accurate information regarding the configuration of objects in the environment that can potentially cause interference with the propagation of RFID signals. Furthermore, where a target object (i.e., the object being tracked by the RFID system) is associated with another object (i.e., an object co-located with the target object), the vision system can also provide the accurate location of the other object, which will be referred to as the associate object. Then, the accurate location of the associate object provided by the vision system can be used as ground truth to train a location model specific to the particular configuration of environment objects for calculating the location of the target object. Multiple location models can be trained for various configurations of environment objects that may be encountered during runtime.

At a runtime stage, the vision system can provide the configuration of environment objects. One of the plurality of trained location models can be selected whose environment configuration accurately (e.g., most closely) mirrors the actual runtime environment configuration. Then, the selected location model can be used to interpret the received RFID signals associated with a target object to calculate the location of the target object. By using the selected location model, the calculation of the target object's location can take into account interferences caused by the environment objects. Furthermore, the vision system may determine the location of an associate object that is co-located with the target object, and therefore, an association relationship may be determined between the associate object and the target object. Having formed the association relationship, the location of the target object can be tracked as being the same as the location of the associate object, which can be accurately determined by the vision system, assuming that the target object and the associate object remain co-located.

Moreover, further training of the location models may be performed during or after runtime. The accurate location of the associate object provided by the vision system during runtime can be used as ground truth location of the target object to further refine and improve the location model. Therefore, the location information provided by the vision system during runtime can be used to continually train the location models, even after offline training has been completed.

FIG. 1 shows a perspective view of a merchandise store 100 as an example environment or scenario. The concepts can be applied to any environment, such as a warehouse, a factory, a house, a farm, a pharmacy, a city street intersection, an airport, etc. Inside merchandise store 100 may be objects 102, such as merchandise items 104, people 106, shopping carts 108, shelves 110, island displays 112, etc. The shelves 110 and island displays 112 can be interspersed between aisles 113. Additionally, merchandise store 100 may have sensors 114. For example, one or more RFID sensors 116 (or readers) can detect RFID tags 118 attached to objects 102. Although the concepts are explained with respect to the RFID technology, other sensor technologies and protocols may be used, such as near-field communication (NFC). RFID tags 118 may be active tags or passive tags. RFID tags 118 may be attached to (or carried by or carried in) any target object for tracking, including merchandise items 104, people 106, shopping carts 108, shelves 110, etc. Furthermore, merchandise store 100 may have one or more vision sensors 120, such as cameras 122 that can visually detect objects. Vision sensors 120 can detect, for example, visible light and/or infrared. Cameras 122 may be 2D or 3D cameras.

Figure 2:
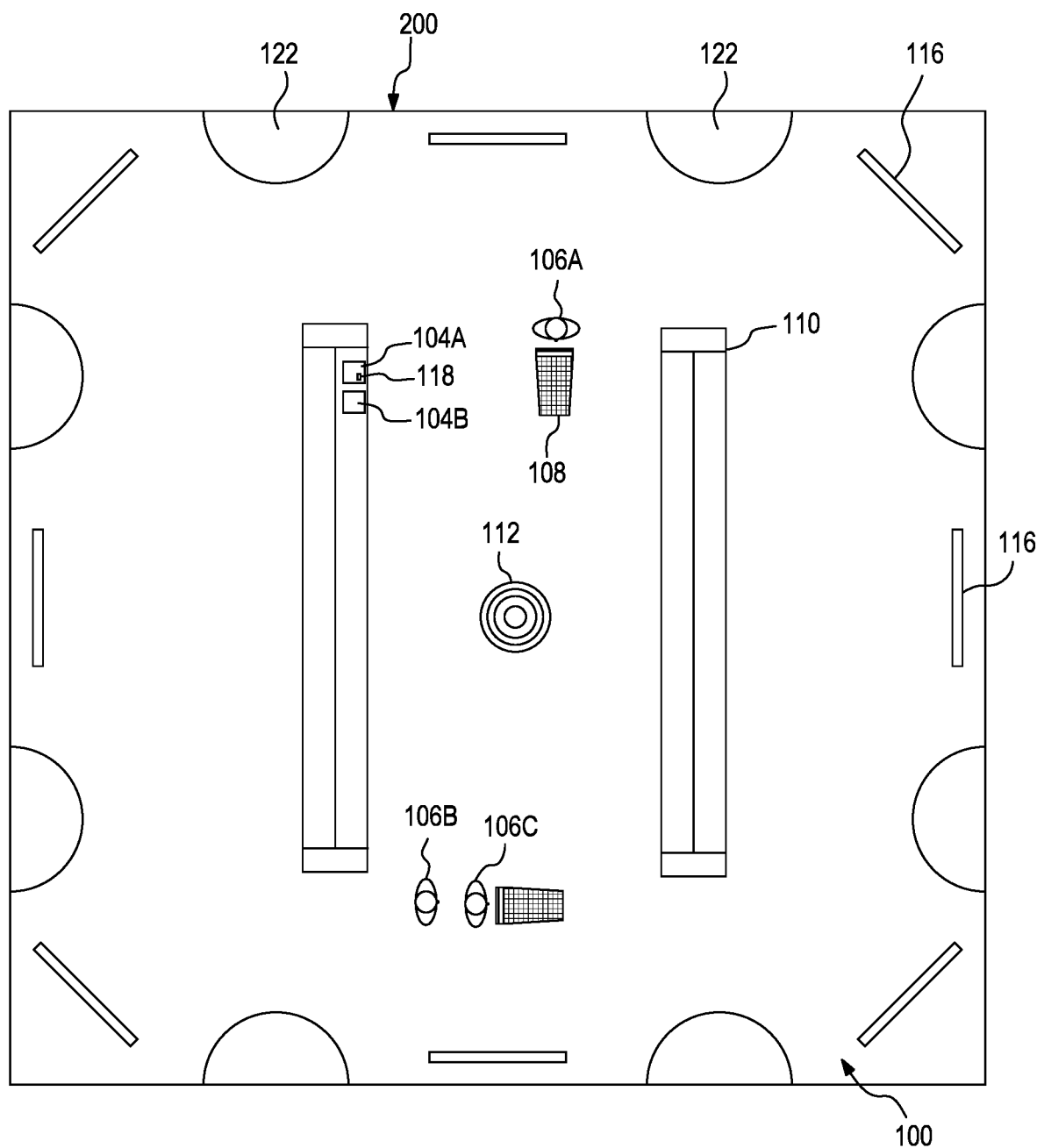
FIG. 2 shows a top-down view of an example location tracking environment where some implementations of the present concepts can be applied.

FIG. 2 shows a top-down view of an environment 200. In this example, environment 200 is merchandise store 100. Environment 200 can include one or more RFID sensors 116, which may be part of an RFID system (designated with specificity relative to FIG. 3). RFID sensors 116 may receive RFID signals emanating from RFID tag 118 attached to merchandise item 104A (e.g., the 'target object' in this example). RFID signals may have, for example, varying characteristics of received signal strength (RSS), phase, and/or doppler shift at different channels. RFID sensors 116 may be arranged in environment 200 to provide the (potentially) maximum coverage of the environment space for detecting RFID signals. Based on the respective positions of RFID sensors 116 and the RFID signals received by RFID sensors 116, an approximate location of merchandise item 104A can be calculated by the RFID system.

However, RFID sensor 116 may not have an unobstructed line of sight to RFID tag 118 attached to merchandise item 104A. Any object 102 in environment 200 can interfere with the RFID signal propagating from RFID tag 118 to RFID sensor 116. People 106 walking around environment 200, shopping carts 108, shelves 110, island displays 112, and/or other merchandise items 1048 can interfere with RFID signal detection. If objects 102 in environment 200 distort or weaken the RFID signals received by RFID sensors 116, then the RFID system may incorrectly calculate the location of merchandise item 104A.

Figure 3:
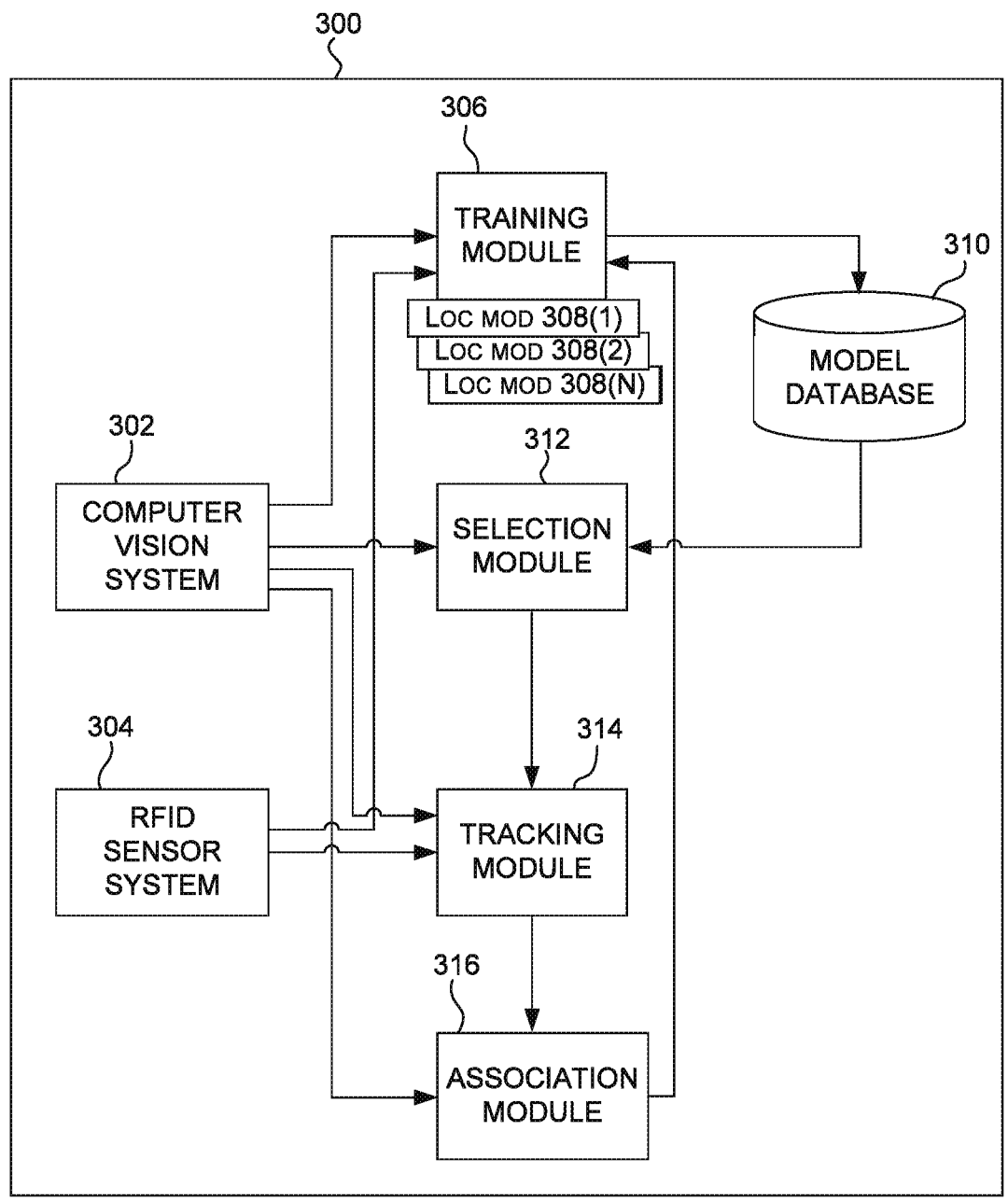
FIG. 3 shows a block diagram of an example location tracking system in accordance with some implementations of the present concepts.

Environment 200 may also include one or more cameras 122, which may be part of a vision system (designated with specificity relative to FIG. 3). Cameras 122 can be capable of detecting objects 102 in environment 200 using, for example, visible light, infrared light, 2D, and 3D technologies. Cameras 122 may be positioned and oriented throughout environment 200 to be able to see objects 102 in environment 200 effectively. The vision system, therefore, can identify the type, number, dimensions, and/or location of objects 102 in environment 200. For example, cameras 122 can detect merchandise items 104, people 106, furniture such as shelves 110 and island displays 112, and shopping carts 108, including their sizes and locations. In other words, the vision system can provide an accurate configuration of objects 102 in environment 200. Furthermore, because the number, location, and size of objects 102 in environment 200 can change frequently, the vision system can provide a continuous feed of accurate and up-to-date real-time configuration information.

FIG. 3 shows a block diagram of an example location tracking system 300. Location tracking system 300 may include a computer vision system 302. Computer vision system 302 can comprise a camera or a set of cameras, such as cameras (122, FIG. 1). Cameras 122 may be configured to detect visible light or invisible light, such as infrared. Cameras 122 may include 2D cameras or 3D cameras, such as red green blue (RGB) cameras, depth sensors, range cameras, and/or stereo cameras. Alternatively, cameras 122 may reside outside computer vision system 302 of location tracking system 300, but computer vision system 302 may be capable of receiving image and video feeds from cameras 122. Computer vision system 302 may include computing components for processing and analyzing images and videos. The computing components may provide, for example, object recognition, motion estimation, and/or 3D pose estimation through rule-based algorithms, pattern recognition, and/or artificial intelligence. Computer vision system 302 can provide a configuration of objects 102 in environment 200. For example, a configuration of environment objects may include the number of people 106, the dimensions and locations of people 106, the dimensions and locations of furniture such as shelves 110 and island displays 112, and/or the dimensions and locations of shopping carts 108. In one implementation, computer vision system 302 may output a list of objects and their location coordinates (x, y, and/or z). Computer visions system 302 may be configured to detect and identify any specific object 102 (e.g., object of interest).

Location tracking system 300 may include an RFID sensor system 304. RFID sensor system 304 can include one or more RFID sensors (116, FIG. 1) for receiving RFID signals from RFID tags (118, FIG. 1) attached to objects (102, FIG. 1). RFID sensor system 304 may provide signal characteristics (e.g., signal strength, phase, and/or doppler effect at different channels as well as the corresponding power setting, read mode, and/or throughput) of one or more RFID signals associated with RFID tag 118 received by RFID sensors 116. In an alternative implementation, RFID sensors 116 may reside outside of RFID sensor system 304 of location tracking system 300.

Location tracking system 300 may include a training module 306. Training module 306 can train (i.e., create and/or modify) a set of location models 308. Location models 308 can take RFID signals (for example, time series of RFID signal strengths, phase, and/or doppler information) associated with RFID tag 118 from RFID sensor system 304 as input, and can output an estimated location of RFID tag 118. From one perspective, location models 308 can be viewed as a signal propagation model that calculates a location of RFID tag 118 based on the signal characteristics detected by RFID sensors 116.

Training an individual location model 308 renders it better suited to interpret the RFID signals and more accurately calculate the location of RFID tag 118 at least because the propagation of the RFID signals can be affected by objects 102 in the environment (200, FIG. 2) that interfere with the RFID signals. Location models 308 may be trained as a weighted vector of the location configuration of environment objects, such as people, furniture, etc. The actual location of RFID tag 118 may be used as ground truth to train the location model, i.e., adjust the parameters of location model 308 such that the location of RFID tag 118 calculated based on the received RFID signals matches the actual location of RFID tag 118. The actual location of RFID tag 118 may be obtained manually or through the use of computer vision system 302. For example, RFID tag 118 may be attached to merchandise item (104, FIG. 1) as a target object detectable by computer vision system 302, or RFID tag 118 may be associated with an associate object that is in close proximity to RFID tag 118. Location models 308 may be trained using, for example, supervised machine learning methods, such as support vector machines (SVM) and neural networks, such as recurrent neural networks (RNN) and convolutional neural networks (CNN), and their variants and/or a combination of these methods.

Multiple location models 308(1)-308(N) may be created for various environments and for various configurations of objects. For example, a location model 308(1) may be trained for merchandise store (100, FIG. 1) that is empty, a location model 308(2) may be trained for merchandise store 100 with a certain layout of shelves 110 and island displays 112, another location model 308(3) may be trained for merchandise store 100 with a different layout of shelves 110 and island displays 112, yet another location model 308(4) may be trained for merchandise store 100 with shopper 106 at a particular location in aisle 113, yet another location model 308(N) may be trained for merchandise store 100 with four shoppers 106 and two shopping carts 108 at certain locations, and so on.

Location tracking system 300 can also include a model database 310, selection module 312, tracking module 314, and/or association module 316. These components are described in more detail below.

Figure 4:
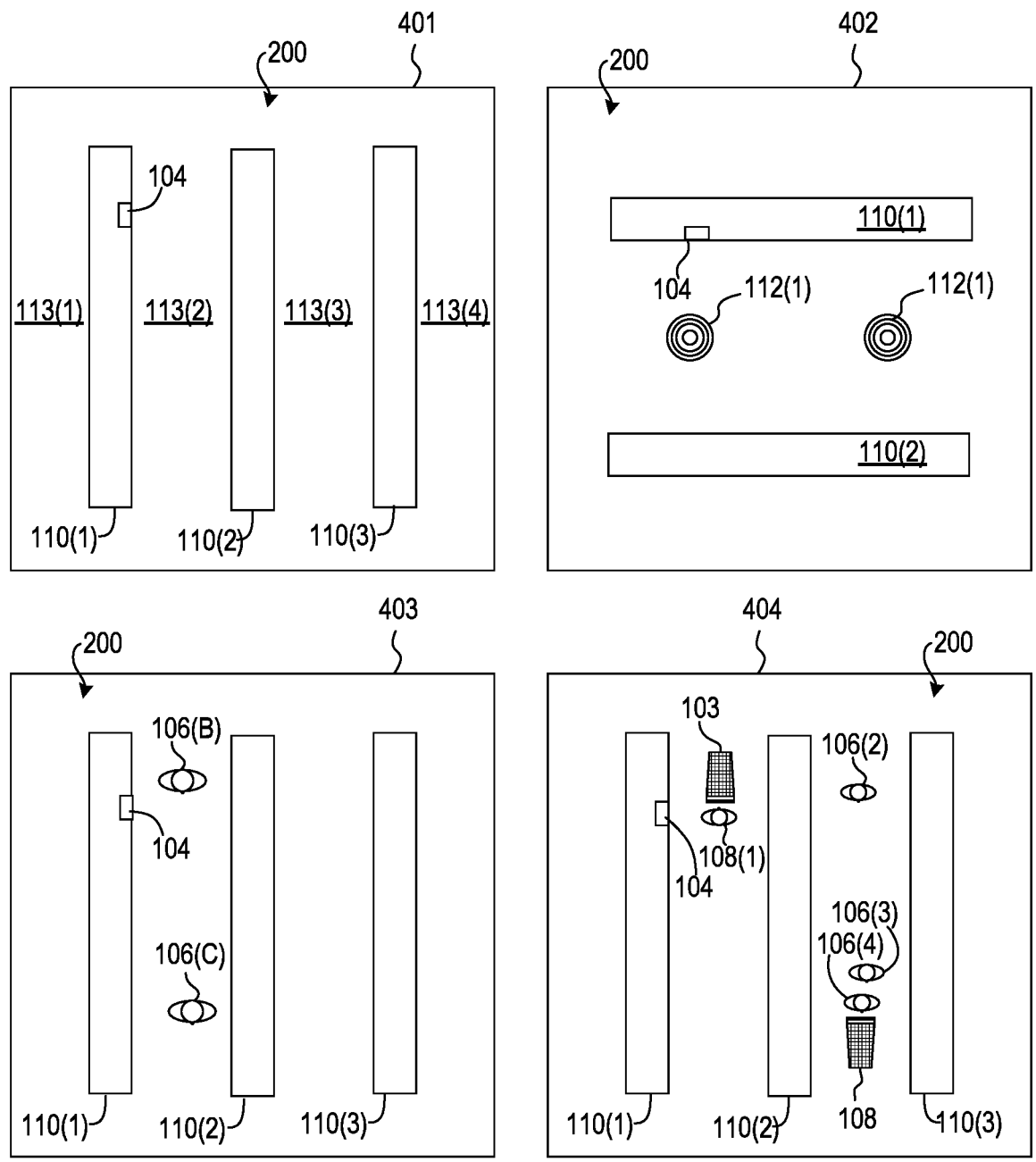
FIG. 4 shows an example set of environment configurations in accordance with some implementations of the present concepts.

FIG. 4 illustrates an example set of environment configurations for which location models (308, FIG. 3) may be trained. The first example shows a first environment configuration 401, where environment 200 is merchandise store 100. There are four aisles 113 divided by three rows of shelves 110 stocked with merchandise items 104. The location model associated with first environment configuration 401 may be suitable for tracking RFID tags 118 in an empty store. Additional location models may be trained for different configurations of furniture that may be arranged in merchandise store 100. The second example shows a second environment configuration 402 where the arrangement of shelves 110 is different and island displays 112 have been added compared to first environment configuration 401. Many different location models may be trained for different arrangements of furniture or other objects (102, FIG. 1) in environment 200.

The third example shows a third environment configuration 403 where environment 200 includes multiple people 106 at various locations. The size and location of people 106 in environment 200 can affect RFID signal propagation differently, so a plurality of location models may be trained to account for various scenarios of people arrangements. The fourth example shows a fourth environment configuration 404 which includes a different number of people 106 compared to third environment configuration 403 and also includes shopping carts 108, which can also interfere with RFID signal propagation. As it should be clear, many location models 308 may be trained for many different configurations of environment objects 102 that location tracking system 300 may encounter in real life during runtime. Any object of interest (e.g., individual object) may be accounted for during the offline training stage by detecting it with computer vision system 302 and adjusting the location model according to how the object affects the received RFID signals.

A large number of location models (308, FIG. 3) may be created to closely match the configuration of environment objects that may be encountered at runtime, accounting for all sorts of objects that may interfere with the propagation of RFID signals. The closer the location model mirrors the actual configuration of environment objects during runtime, the more accurate the location model tends to be at calculating the location of the target object attached to RFID tag 118. Because it tends to be impractical to create almost an infinite number of location models for every possible environment configuration, it is sensible to create location models for major configurations of environment objects.

Referring again to FIG. 3, as mentioned above location tracking system 300 may include model database 310 for storing the location models 308. Location tracking system 300 may also include selection module 312. At runtime, selection module 312 can process an actual configuration of objects provided by computer vision system 302 and can select a location model from the location models stored in model database 310. Selection module 312 may select a location model whose configuration of objects most closely mirrors the actual configuration of objects provided by computer vision system 302. The criteria for selecting the best location model may include, for example, the type of objects (person, furniture, shopping cart, etc.), the number of objects, the location of objects, the dimension of objects, etc. Any other criteria that affect the propagation of RFID signals, such that the location model should account for them, can also be considered in the selection process.

Selection module 312 may use one or a combination of several methods for selecting the location model, such as using simple classifier/selector models or neural network models. For example, if the actual configuration of environment objects provided by computer vision system 302 during runtime exactly matches the environment configuration of one of the location models stored in model database 310, then selection module 312 can select that location model. However, if there is no exact match, then selection module 312 can use, for example, a similarity-based method (SBM) model to calculate the distances between the actual environment configuration and the environment configurations of the candidate location models, and select the closest configuration (i.e., the one with the minimal distance). In one aspect, each environment configuration is represented as a weighted vector of locations of environment objects, and the closeness of two environment configurations can be represented by the distance between two vectors. Alternatively, a neural network model may be used to select the environment configuration of the location model that potentially most closely matches the actual environment configuration. In one implementation, the selection of a location model is a learning problem involving determining a matching environment configuration as well as determining which environment objects affect RF signal propagation and by how much.

Location tracking system 300 may include tracking module 314. Tracking module 314 can use the location model 308 selected by selection module 312 to interpret one or more RFID signals provided by RFID sensor system 304 and can calculate the location of RFID tag 118. In one implementation, the output of tracking module 314 (i.e., the calculated location of RFID tag 118 and hence the location of merchandise item 104) may be the output of location tracking system 300.

Location tracking system 300 may also include association module 316. Association module 316 may receive the locations of objects 102 (e.g., people 106, shopping carts 108, shelves 110, etc.) from computer vision system 302 and also receive the locations of RFID tags 118 from tracking module 314. Association module 316 may form an association relationship between an object and an RFID tag that are co-located (i.e., in proximity to each other). The association relationship may be created based on the proximity of the object and the RFID tag at one point in time or during a period of time. For example, association module 316 may create an association relationship between RFID tag 118 (which is attached to merchandise item 104) and shelf 110 based on information that RFID tag 118 and shelf 110 have the same location and are both stationary. This association relationship indicates that merchandise item 104 is sitting on shelf 110, and therefore, merchandise item 104 may be considered to be in stock at merchandise store 100.

If the location of RFID tag 118 is the same as an individual person 106 (e.g., shopper), and both are moving together, for example, down the aisle, for a duration of time, then association module 316 may form an association relationship between RFID tag 118 (which is attached to merchandise item 104) and person 106. Such an association relationship may indicate that person 106 has picked up merchandise item 104 off shelf 110. In this example scenario, association module 316 may remove the previous association relationship between merchandise item 104 and shelf 110. As another example, if the location of RFID tag 118 attached to merchandise item 104 is the same as the location of shopping cart 108(1), and both are moving together, then association module 316 may form an association relationship between merchandise item 104 and shopping cart 108(1). This association relationship may indicate that merchandise item 104 has been placed inside shopping cart 108. Association module 316 may continuously or periodically monitor and update the association relationships based on the locations of RFID tags 118 provided by tracking module 314 and the locations of objects provided by computer vision system 302. In one implementation, the location of a target object output by location tracking system 300 may be the location of the associate object (i.e., the object which has an association relationship with the target object to which an RFID tag is attached) provided by computer vision system 302.

In one implementation, the association relationships maintained by association module 316 may be assigned probability values (or certainty values). For example, if merchandise item 104, with RFID tag 118 attached to it, has been removed from shelf 110, and there are two shoppers 106B and 106C in close proximity to each other and in close proximity to merchandise item 104, association module 316 may not be able to determine with certainty that merchandise item 104 should be associated with one shopper 106B or the other shopper 106C. In other words, it may be difficult to determine which of the two shoppers 106B and 106C has picked up merchandise item 104 off shelf 110. Accordingly, association module 316 may calculate and assign a probability value to the association relationship between merchandise item 104 and shopper 106B, and assign another probability value to the association relationship between merchandise item 104 and shopper 106C. If the two shoppers 106B and 106C walk away from each other and the location of merchandise item 104, as determined by tracking module 314, is closer to the location of one shopper 106B than the other shopper 106C, and the movement trajectory and speed of merchandise item 104 more closely match one shopper 106B more than the other shopper 106C, then association module 316 may be able to differentiate between the two shoppers 106B and 106C by assigning a higher probability association relationship to one shopper 106B and a lower probability association relationship to the other shopper 106C. In one implementation, association module 316 may determine that an RFID tag is associated with a target object if their association relationship's probability value is at or above a certain threshold probability value.

According to an aspect of the concepts, location models (308, FIG. 3) may continue to be trained even after the initial offline training stage. That is, location models may be further modified, enhanced, and refined during or after runtime to improve their accuracy. For example, once an association relationship has been formed between RFID tag 118 and shopping cart 108 (e.g., shopper 106 placed merchandise item 104 in shopping cart 108), the location of shopping cart 108 may be used as ground truth location of RFID tag 118 to modify the location model for increased accuracy. Since the location of shopping cart 108 can be accurately tracked using computer vision system 302, it can serve as ground truth location of RFID tag 118 and be provided to training module 306.

Training module 306 can then compare the location calculated by processing the RFID signals associated with RFID tag 118 received by RFID sensor system 304 using the current location model with the ground truth location of RFID tag 118 provided by computer vision system 302. If the calculated location and the ground truth location are different, then training module 306 can make appropriate adjustments to the location model such that the calculated location using the modified location model would match the ground truth location. Therefore, training module 306 can use feedback information from runtime to update and enhance location models for more accurate location tracking. The location models can keep on improving as location tracking system 300 is put in use. It should be apparent that an improved location model improves the ability of location tracking system 300 to accurately and precisely track RFID tags 118 and thereby more accurately make associations between RFID tags 118 and associate objects.

The various components of location tracking system 300 may be local to location tracking system 300 or remote from but accessible by location tracking system 300. The components of location tracking system 300 may be localized in one computing system or distributed among multiple computing systems. Each component of location tracking system 300 may include hardware, software, or a combination of both, and comprise algorithms for performing the disclosed processes. Furthermore, although various components of location tracking system 300 may have been illustrated and described as disparate systems, they may share hardware and/or software resources and have overlapping functionalities without definitive boundaries between them. For example, model database 310 is shown in FIG. 3 as a freestanding component but it may be incorporated into another module, such as training module 306.

Figure 5:
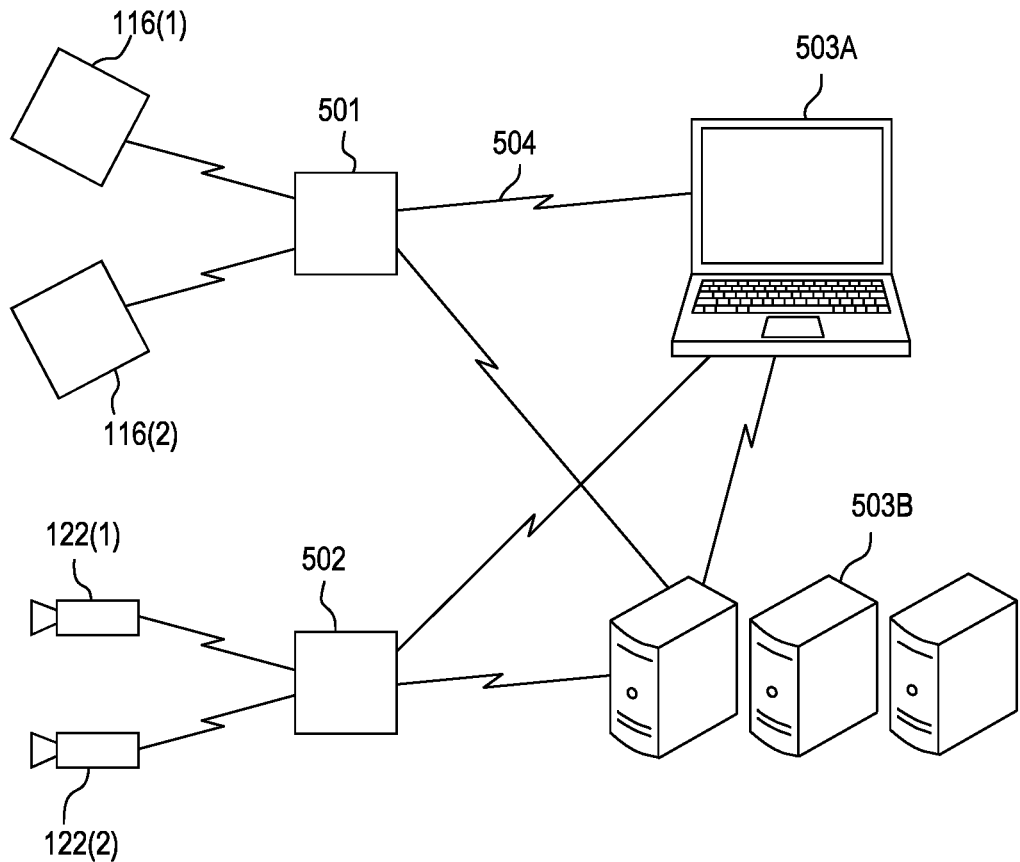
FIG. 5 shows an example system for implementing the present location tracking concepts.

FIG. 5 shows an example system 500 that can accomplish location tracking concepts. For purposes of explanation, system 500 includes RFID sensors 116 and cameras 122. System 500 may also include an RFID sensor controller 501 and a vision sensor controller 502. RFID sensor controller 501 can coordinate functions of and/or receive data from RFID sensors 116. In implementations where RFID sensors 116 are manifest as RFID antennas, RFID sensor controller 501 can be an RFID reader. The RFID reader can coordinate operations of the RFID antennas, such as at what time and at what power each RFID antenna transmits. Vision sensor controller 502 can coordinate functions of and/or receive data from cameras 122.

System 500 can also include one or more devices 503. Generally, any of devices 503 can perform the offline training method discussed with respect to FIG. 6 and/or the location tracking method discussed with respect to FIG. 7. In the illustrated example, device 503A is a personal computer device and device 503B is a server device.

In this illustration, RFID sensor controller 501 and vision sensor controller 502 are external to device 503. In other implementations, RFID sensor controller 501 and/or vision sensor controller 502 may be incorporated into device 503. RFID sensors 116, cameras 122, RFID sensor controller 501, vision sensor controller 502, and/or devices 503 can communicate via one or more networks (represented by lightning bolts 504) and/or can access the Internet over the networks. As illustrated in FIGS. 1 and 2, RFID sensors 116 and cameras 122 may be proximate to the location tracking environment. RFID sensor controller 501, vision sensor controller 502, and/or device 503 can be proximate to the location tracking environment or remotely located. For instance, in one configuration, device 503A could be located proximate to the location tracking environment (e.g., in the same building), while device 503B could be remotely located, such as a server farm in a data center (e.g., cloud-based resource).

FIG. 5 shows two example device configurations 505 that can be employed by device 503. Device 503 can employ either of configurations 505A or 505B, or an alternate configuration. Briefly, device configuration 505A represents an operating system (OS) centric configuration. Configuration 505B represents a system on a chip (SoC) configuration. Configuration 505A may be organized into hardware 506, operating system 507, and one or more applications 508. Configuration 505B may be organized into shared resources 509, dedicated resources 510, and an interface 511 therebetween.

In either configuration 505, device 503 can include a processor 512, storage 513, such as memory, and a location tracking component 514. Location tracking component 514 can include training module 306, selection module 312, tracking module 314, and/or association module 316 described above relative to FIG. 3. Location tracking component 514 can include a training algorithm that can train location models (308, FIG. 3) by analyzing data from RFID sensors 116 and cameras 122. Location models 308 may be stored in memory 513, for instance. Location tracking component 514 can include a tracking algorithm that can calculate the location of a target object by using location models 308 to analyze data from RFID sensors 116 and cameras 122. Location tracking component 514 can include an association algorithm that can associate target objects with associate objects by analyzing data from RFID sensors 116 and cameras 122.

In some configurations, each of devices 503 can have an instance of location tracking component 514. The functionalities that can be performed by each instance of location tracking component 514 may be the same or they may be different from one another. For instance, in some cases, each device's location tracking component 514 can be robust and provide all of the functionalities of the described concepts. In other cases, some devices 503 can employ a less robust instance of location tracking component 514 that relies on some functionalities to be performed remotely by another device 503. For instance, device 503B may have more processing and storage resources than device 503A. In such a configuration, for example, training of location models may be performed by device 503B, while tracking of target objects may be performed by device 503A.

The term "computing device" as used herein can mean any type of device that has processing capability and/or storage capability. Processing capability can be provided by one or more processors that can execute data in the form of computer-readable instructions to provide a functionality. Data, such as computer-readable instructions and/or user-related data, can be stored on storage, such as storage that can be internal or external to the computing device. The storage can include any one or more of volatile or non-volatile memory, hard drives, flash storage devices, or optical storage devices (e.g., CDs, DVDs, etc.), remote storage (e.g., cloud-based storage), among others. As used herein, the term "computer-readable media" can include transitory propagating signals. In contrast, the term "computer-readable storage media" excludes transitory propagating signals. Computer-readable storage media includes computer-readable storage devices. Examples of computer-readable storage devices include volatile storage media, such as RAM, and non-volatile storage media, such as hard drives, optical discs, and flash memory, among others.

Examples of computing devices include personal computers, desktop computers, servers, notebook computers, cell phones, smart phones, tablets, personal digital assistants, pad type computers, mobile computers, appliances, smart devices, IoT devices, etc. and any of a myriad of ever-evolving or yet to be developed types of computing devices.

The term "processor" as used herein can refer to central processing units (CPUs), graphical processing units (GPUs), field programmable gate arrays (FPGAs), controllers, micro-controllers, processor cores, or other types of processing devices.

Generally, any of the functions described herein can be implemented using software, firmware, hardware (e.g., fixed-logic circuitry), or a combination of these implementations. The term "component" as used herein generally represents software, firmware, hardware, whole devices or networks, or a combination thereof. In the case of a software implementation, for instance, these may represent program code that performs specified tasks when executed on a processor (e.g., CPU or CPUs). The program code can be stored in one or more computer-readable memory devices, such as computer-readable storage media. The features and techniques of the component are platform-independent, meaning that they may be implemented on a variety of commercial computing platforms having a variety of processing configurations.

Figure 6:
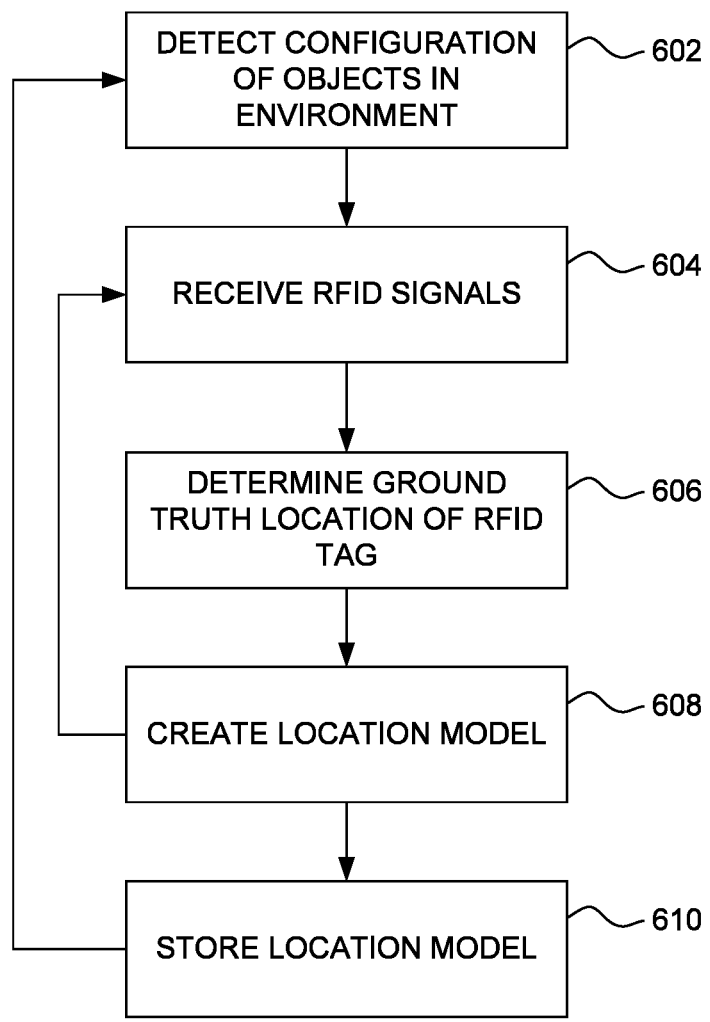
FIG. 6 shows a flow chart of an example offline training method that can implement some of the present concepts.

FIG. 6 shows a flow chart of a method 600 for offline training. In one example, this method could be employed relative to location tracking system 300 during an offline training stage. Method 600 may be implemented on many different types of devices, for example, by one or more cloud servers; by a client device, such as a laptop, tablet, or smartphone; or by combinations of servers and client devices. In block 602, a configuration of objects in an environment (such as environment 200 of FIG. 2) may be detected. In block 604, RFID signals associated with an RFID tag (such as RFID tag 118 of FIG. 1) attached to a merchandise item (such as merchandise item 104 of FIG. 1) may be received. In block 606, the ground truth location of the RFID tag may be determined. The ground truth location of the RFID tag may be provided manually or provided by a vision system, such as computer vision system 302 of FIG. 3. The vision system may provide the ground truth location of the RFID tag by detecting the location of the merchandise item to which the RFID tag is attached or by detecting the location of an associate object with which merchandise item (and hence RFID tag) is co-located. In block 608, the RFID signals associated with the RFID tag can be processed in view of the ground truth location of the RFID tag, and a location model can be created. In one implementation, blocks 604-608 may be repeated multiple times where the RFID tag is situated at various locations throughout the environment at each iteration to more fully train the location model and thereby increase the accuracy of the location model. In block 610, the location model can be stored. Method 600 (blocks 602-610) in FIG. 6 may be repeated for different configurations of objects in the environment to create multiple location models. At the end of the offline training stage, a plurality of environment-specific signal-propagation location models may have been generated and stored.

Figure 7:
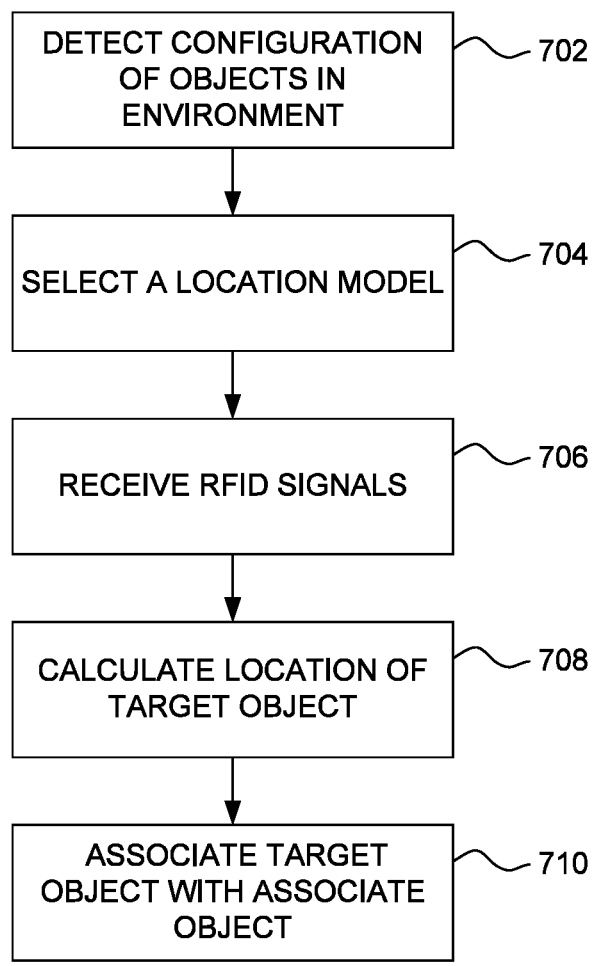
FIG. 7 shows a flow chart of an example runtime method for location tracking that can implement some of the present concepts.

FIG. 7 shows a flow chart of an example method 700 for location tracking at runtime. In one example, this method could be employed relative to location tracking system (300, FIG. 3) during a runtime stage. Method 700 may be implemented on many different types of devices, for example, by one or more cloud servers; by a client device, such as a laptop, tablet, or smartphone; or by combinations of servers and client devices. In block 702, a configuration of objects in an environment can be detected. In block 704, a location model can be selected from a plurality of location models (e.g., those trained through method 600). In block 706, RFID signals associated with the RFID tag attached to the merchandise item may be received. In block 708, the received RFID signals may be interpreted using the selected location model and a location of the merchandise item may be calculated. In block 710, an association relationship between the merchandise item and an associate object in the environment may be determined based on the location of the merchandise item and the location of the associate object.

Method 700, either in part or in whole, may be repeated continuously or periodically during runtime. For instance, blocks 706-708 may continue to repeat at runtime. As the merchandise item and the RFID tag attached thereto move around inside the environment, updated RFID signals from the RFID tag may be received, and a new location for the merchandise item may be calculated. As another example, objects in the environment may be detected continually, for example, as shoppers and shopping carts enter and exit merchandise store, as shoppers and shopping carts move around inside merchandise store, and/or as shelves and island displays are re-positioned in the merchandise store. Accordingly, the updated (i.e., newly detected) configuration of objects may be continually compared with the configurations associated with the plurality of stored location models.

If the environment configuration associated with a different location model is a better match for the updated configuration of environment objects than the environment configuration associated with the currently selected location model, then the different location model may be selected for interpreting the received RFID signals. Therefore, various location models may be used during runtime to track target objects as the selection of the location model in use changes to more closely mirror the current configuration of environment objects. Furthermore, association relationships may continually be revised, for example, by forming new association relationships and deleting old association relationships, as the location of the merchandise item and the location of the associate object are updated.

Either during runtime or afterwards, once an association relationship has been formed between the merchandise item and an associate object, the location of the associate object may be used as the ground truth location of the merchandise item to further train (i.e., modify and refine) the location model.

Figure 8:
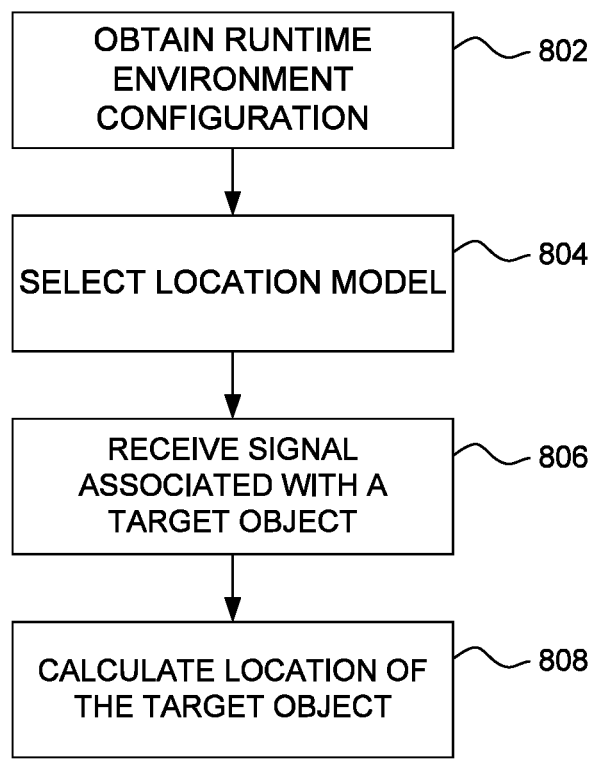
FIG. 8 shows a flow chart of an example method for location tracking that can implement some of the present concepts.

FIG. 8 shows a flow chart of another example method 800 for location tracking in an environment. In one example, this method could be employed in the environments described above. Further, the method lends itself to use in many different types of environments. For instance, the method can be utilized to identify relationships between objects and users in an industrial setting.

In block 802, a runtime environment configuration of environment objects can be obtained. For instance, the runtime environment configuration can be obtained by sensing the configuration of objects in the environment. For instance, cameras can be used to sense the configuration. Alternatively, the runtime environment configuration can be obtained from another party that sensed or otherwise detected the configuration of objects in the environment.

In block 804, a location model can be selected based at least on a training environment configuration of the selected location model and the runtime environment configuration.

In block 806, a signal associated with a target object can be received. In block 808, a location of the target object can be calculated by interpreting the signal using the selected location model.

The described processes may be performed by the systems or components described herein. The order in which the processes are described is not intended to be construed as a limitation, and any number of the described acts can be combined in any order to implement the disclosed processes or alternative implementations. Furthermore, the processes can be implemented in any suitable hardware, software, firmware, or combination thereof, such that a computing device can implement the processes. In one case, the processes are stored on one or more computer-readable storage media as a set of computer-readable instructions, such that execution by a processor of a computing device causes the computing device to perform the processes.

Although the subject matter relating to location tracking has been described in language specific to structural features and methodological acts, it is to be understood that the subject matter defined in the appended claims is not necessarily limited to the specific features or acts described above. Rather, the specific features and acts described above are disclosed as non-limiting example forms of implementing the claims.

Various examples are described above. Additional examples are described below. One example includes a method comprising visually detecting a runtime environment configuration of environment objects, selecting a location model from a plurality of location models based at least on a training environment configuration of the selected location model and the runtime environment configuration, receiving a radio frequency (RF) signal associated with a target object, and determining a location of the target object by interpreting the RF signal using the selected location model.

Another example can include any of the above and/or below examples where the above method further comprises visually determining a location of an associate object, and associating the target object with the associate object based at least on a proximity of the location of the target object and the location of the associate object.

Another example can include any of the above and/or below examples where the above method further comprises modifying the selected location model based at least on the RF signal associated with the target object and the location of the associate object.

Another example can include any of the above and/or below examples where the modifying of the selected location model comprises using the location of the associate object as a ground truth location of the target object.

Another example can include any of the above and/or below examples where the above method further comprises training the plurality of location models for a plurality of training environment configurations based at least on a training environment configuration of environment objects and an RF signal associated with a training target object.

Another example can include any of the above and/or below examples where the training is further based at least on a ground truth location of the training target object.

Another example can include any of the above and/or below examples where the plurality of location models are associated with a plurality of training environment configurations, and the selected location model is identified based at least on determining that the training environment configuration associated with the selected location model is the most similar among the plurality of training environment configurations to the runtime environment configuration.

Another example can include any of the above and/or below examples where the above method further comprises representing the plurality of training environment configurations as training environment vectors, representing the runtime environment configuration as a runtime environment vector, and designating one of the plurality of training environment configurations having the shortest vector distance to the runtime environment vector as the most similar training environment configuration.

Another example can include any of the above and/or below examples where the visually detecting comprises receiving image or video information.

Another example can include any of the above and/or below examples where the RF signal includes at least one of signal strength information, phase information, and doppler effect information.

Another example can include any of the above and/or below examples where the above method further comprises receiving an RF device configuration including at least one of power, mode, and throughput.

Another example includes a system comprising one or more hardware processors. The system also comprises at least one computer-readable storage medium storing instructions which, when executed by the one or more hardware processors, cause the one or more hardware processors to perform operations of determining a runtime environment configuration of environment objects, receiving an RF signal associated with a target object of the environment objects, selecting a location model from a plurality of location models based at least on a training environment configuration associated with the selected location model and the runtime environment configuration, calculating a location of the target object by interpreting the RF signal using the selected location model, and outputting the location of the target object.

Another example can include any of the above and/or below examples where the instructions further cause the one or more hardware processors to perform the operations of receiving a location of an associate object and associating the target object with the associate object based at least on a proximity of the location of the target object and the location of the associate object.

Another example can include any of the above and/or below examples where the instructions further cause the one or more hardware processors to perform the operations of modifying the selected location model based at least on the RF signal associated with the target object and the location of the associate object.

Another example can include any of the above and/or below examples where the modifying of the selected location model uses the location of the associate object as a ground truth location of the target object.

Another example can include any of the above and/or below examples where the instructions further cause the one or more hardware processors to perform the operations of training the plurality of location models for a plurality of training environment configurations based at least on a training environment configuration of environment objects and an RF signal associated with a training target object.

Another example can include any of the above and/or below examples where the training is further based at least on a ground truth location of the training target object.

Another example can include any of the above and/or below examples where the location of the associate object is output as the location of the target object.

Another example can include any of the above and/or below examples where the above system further comprises one or more RF sensors for receiving the RF signal.

Another example can include any of the above and/or below examples where the interpreting of the RF signal includes analyzing at least one of signal strength information, phase information, and doppler information associated with the RF signal.

Another example can include any of the above and/or below examples where the instructions further cause the one or more hardware processors to perform the operations of receiving an RF device configuration including at least one of power, mode, and throughput.

Another example includes a computer readable storage medium comprising instructions which, when executed by one or more hardware processors, cause the one or more hardware processors to perform a process including obtaining a runtime environment configuration of environment objects, selecting a location model based at least on a training environment configuration of the selected location model and the runtime environment configuration, receiving a signal associated with a target object, and calculating a location of the target object by interpreting the signal using the selected location model.

Another example can include any of the above and/or below examples where the target object is one of the environment objects.

The invention claimed is:

1. A method, comprising:
visually detecting a runtime environment configuration of environment objects;
selecting a location model from a plurality of location models associated with a plurality of training environment configurations based at least on the runtime environment configuration;
receiving a radio frequency (RF) signal associated with a target object; and
determining a location of the target object by interpreting the RF signal using the selected location model that accounts for interferences caused by the environment objects to the RF signal.

2. The method of claim 1, further comprising:
visually determining a location of an associate object; and
associating the target object with the associate object based at least on a proximity of the location of the target object and the location of the associate object.

3. The method of claim 2, further comprising:
modifying the selected location model based at least on the RF signal associated with the target object and the location of the associate object.

4. The method of claim 3, wherein the modifying of the selected location model comprises using the location of the associate object as a ground truth location of the target object.

5. The method of claim 1, further comprising:
training the plurality of location models associated with the plurality of training environment configurations based at least on:
 a training environment configuration of environment objects; and
 an RF signal associated with a training target object.

6. The method of claim 5, wherein the training is further based at least on a ground truth location of the training target object.

7. The method of claim 1, wherein:
the selected location model is selected based at least on determining that one of the plurality of training environment configurations is the closest among the plurality of training environment configurations to the runtime environment configuration.

8. The method of claim 7, further comprising:
representing the plurality of training environment configurations as training environment vectors;
representing the runtime environment configuration as a runtime environment vector; and
designating the one of the plurality of training environment configurations having the shortest vector distance to the runtime environment vector as the closest training environment configuration.

9. The method of claim 1, wherein the visually detecting comprises receiving image or video information.

10. The method of claim 1, wherein the RF signal includes at least one of signal strength information, phase information, and doppler effect information.

11. A system, comprising:
one or more hardware processors;
at least one computer-readable storage medium storing instructions which, when executed by the one or more hardware processors, cause the one or more hardware processors to perform operations of:
 determining a runtime environment configuration of environment objects;
 receiving an RF signal associated with a target object;
 selecting a location model from a plurality of location models associated with a plurality of training environment configurations based at least on the runtime environment configuration;
 calculating a location of the target object by interpreting the RF signal using the selected location model that accounts for interferences caused by the environment objects to the RF signal; and
 outputting the location of the target object.

12. The system of claim 11, wherein the instructions further cause the one or more hardware processors to perform the operations of:
receiving a location of an associate object; and
associating the target object with the associate object based at least on a proximity of the location of the target object and the location of the associate object.

13. The system of claim 12, wherein the instructions further cause the one or more hardware processors to perform the operations of:
modifying the selected location model based at least on the RF signal associated with the target object and the location of the associate object.

14. The system of claim 13, wherein the modifying of the selected location model uses the location of the associate object as a ground truth location of the target object.

15. The system of claim 11, wherein the instructions further cause the one or more hardware processors to perform the operations of:
training the plurality of location models associated with the plurality of training environment configurations based at least on:
 a training environment configuration of environment objects; and
 an RF signal associated with a training target object.

16. The system of claim 15, wherein the training is further based at least on a ground truth location of the training target object.

17. The system of claim 12, wherein the location of the associate object is output as the location of the target object.

18. The system of claim 11, further comprising:
one or more RF sensors for receiving the RF signal.

19. The system of claim 11, wherein the interpreting of the RF signal includes analyzing at least one of signal strength information, phase information, and doppler information associated with the RF signal.

20. A computer readable storage medium comprising instructions which, when executed by one or more hardware processors, cause the one or more hardware processors to perform a process including:
obtaining a runtime environment configuration of environment objects;
selecting a location model based at least on a training environment configuration of the selected location model and the runtime environment configuration;
receiving a signal associated with a target object; and
calculating a location of the target object by interpreting the signal using the selected location model that accounts for interferences caused by the environment objects to the signal.

* * * * *